United States Patent
Komazawa

(10) Patent No.: US 11,710,017 B2
(45) Date of Patent: Jul. 25, 2023

(54) MEDIUM OUTPUT CONTROL DEVICE AND NON-TRANSITORY COMPUTER READABLE MEDIUM FOR OUTPUTTING A MEDIUM WITH A DEFECT TO A DIFFERENT LOCATION

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/550,515

(22) Filed: Dec. 14, 2021

(65) Prior Publication Data

US 2023/0068732 A1 Mar. 2, 2023

(30) Foreign Application Priority Data

Aug. 27, 2021 (JP) ................................ 2021-139109

(51) Int. Cl.
*G06K 15/00* (2006.01)
*G06K 15/16* (2006.01)

(52) U.S. Cl.
CPC .......... *G06K 15/403* (2013.01); *G06K 15/16* (2013.01); *G06K 15/408* (2013.01); *G06K 15/4065* (2013.01)

(58) Field of Classification Search
CPC ........................... G06K 15/403; G06K 15/408
See application file for complete search history.

(56) References Cited

U.S. PATENT DOCUMENTS

| | | | |
|---|---|---|---|
| 10,931,842 B1* | 2/2021 | Morales | H04N 1/00623 |
| 2013/0141750 A1* | 6/2013 | Suzuki | G06F 3/1235 358/1.14 |
| 2014/0104625 A1* | 4/2014 | Fujinaga | G06K 15/022 358/1.2 |
| 2015/0307310 A1* | 10/2015 | Miyake | B65H 29/58 270/58.07 |
| 2015/0314978 A1* | 11/2015 | Miyajima | B41J 29/38 271/298 |
| 2017/0082963 A1* | 3/2017 | Tsue | G03G 15/5062 |
| 2018/0124257 A1* | 5/2018 | Ueda | H04N 1/0049 |
| 2019/0121586 A1* | 4/2019 | Tsukamoto | G06F 3/1285 |
| 2020/0322492 A1* | 10/2020 | Kurohata | H04N 1/00076 |
| 2021/0118115 A1* | 4/2021 | Tsukamoto | G06T 1/20 |
| 2022/0135360 A1* | 5/2022 | Xie | G03G 15/5062 270/52.14 |

FOREIGN PATENT DOCUMENTS

JP 2013-114246 A 6/2013

* cited by examiner

*Primary Examiner* — Benjamin O Dulaney
(74) *Attorney, Agent, or Firm* — Sughrue Mion, PLLC

(57) ABSTRACT

A medium output control device includes a processor configured to: perform control to output, among plural mediums to be output, a medium without a defect to a first output location; perform control to output, among the plural mediums, a medium with a defect to an output location different from the first output location; and perform control to, after the medium with a defect is output to the output location different from the first output location, keep outputting a medium without a defect among the plural mediums to the first output location until a quantity of mediums output to the first output location reaches a predetermined quantity.

11 Claims, 11 Drawing Sheets

MEDIUM OUTPUT CONTROL DEVICE AND NON-TRANSITORY COMPUTER READABLE MEDIUM FOR OUTPUTTING A MEDIUM WITH A DEFECT TO A DIFFERENT LOCATION

CROSS-REFERENCE TO RELATED APPLICATIONS

This application is based on and claims priority under 35 USC 119 from Japanese Patent Application No. 2021-139109 filed Aug. 27, 2021.

BACKGROUND

(i) Technical Field

The present disclosure relates to a medium output control device and a non-transitory computer readable medium.

(ii) Related Art

Japanese Unexamined Patent Application Publication No. 2013-114246 discloses a sheet processing device including first and second sheet output functions and a first controller. The first sheet output function is able to allocate and output sheets that are judged to have been printed in a normal state to plural output trays. The second sheet output function outputs sheets that are judged to be reprinted to a sheet output unit. The sheet output unit is disposed farther upstream than the first sheet output function. Every time it is judged that a sheet is to be reprinted, the first controller outputs this sheet to the sheet output unit and also outputs sheets that follow the sheet output to the sheet output unit and that are judged to have been printed in a normal state to an output tray different from the output trays used by the first output function. These output trays have output sheets that precede the sheet output to the sheet output unit and that are judged to have been printed in a normal state.

SUMMARY

To output plural mediums, if an output location is switched every time a defect is found in a medium, output locations may not become enough to accommodate all the mediums. Conversely, if, after a defect is found in a medium, mediums without a defect are unlimitedly kept outputting to the same output location, an unfavorable situation may occur when using such mediums without a defect. For example, when supplying mediums without a defect by using a supplier, the quantity of the mediums may exceed the capacity of the supplier and be unable to be supplied.

Aspects of non-limiting embodiments of the present disclosure relate to avoiding an unfavorable situation which would be caused by unlimitedly keeping outputting mediums to the same output location, as well as to accommodating all mediums in output locations.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a medium output control device including a processor configured to: perform control to output, among plural mediums to be output, a medium without a defect to a first output location; perform control to output, among the plural mediums, a medium with a defect to an output location different from the first output location; and perform control to, after the medium with a defect is output to the output location different from the first output location, keep outputting a medium without a defect among the plural mediums to the first output location until a quantity of mediums output to the first output location reaches a predetermined quantity.

BRIEF DESCRIPTION OF THE DRAWINGS

An exemplary embodiment of the present disclosure will be described in detail based on the following figures, wherein.

DETAILED DESCRIPTION

An exemplary embodiment of the disclosure will be described below in detail with reference to the accompanying drawings.

[Overview of Exemplary Embodiment]

In the exemplary embodiment, there is provided a medium output control device that performs control to output, among plural mediums to be output, a medium without a defect to a first output location, performs control to output, among the plural mediums, a medium with a defect to an output location different from the first output location, and performs control to, after the medium with a defect is output to the output location different from the first output location, keep outputting a medium without a defect among the plural mediums to the first output location until a quantity of mediums output to the first output location reaches a predetermined quantity.

The medium is an object used for providing certain information and is transported to an output unit and is output therefrom. Examples of the medium are paper and plastic sheets. A description will be given by taking a sheet of paper as an example of the medium.

The quantity of mediums is an attribute of the mediums and has magnitude which can be represented by a combination of the number and a unit of measurement. Examples of the quantity of mediums are the number of mediums and the weight of mediums. A description will be given by taking the number as an example of the quantity of mediums.

If a defect is found in a medium, it means that the state of the medium is not good, such as the state of a printed medium is not good or the state of a transported medium is not good. If the state of a printed medium is not good, it means that there is a stain in an image formed in the printed medium, for example. If the state of a transported medium is not good, it means that the medium is damaged while being transported, for example. Various defects that may be detected in a medium may be considered, and an explanation will be given through illustration of a case in which the state of a printed medium is not good.

[Overall Configuration of Image Forming System]

Figure 1:
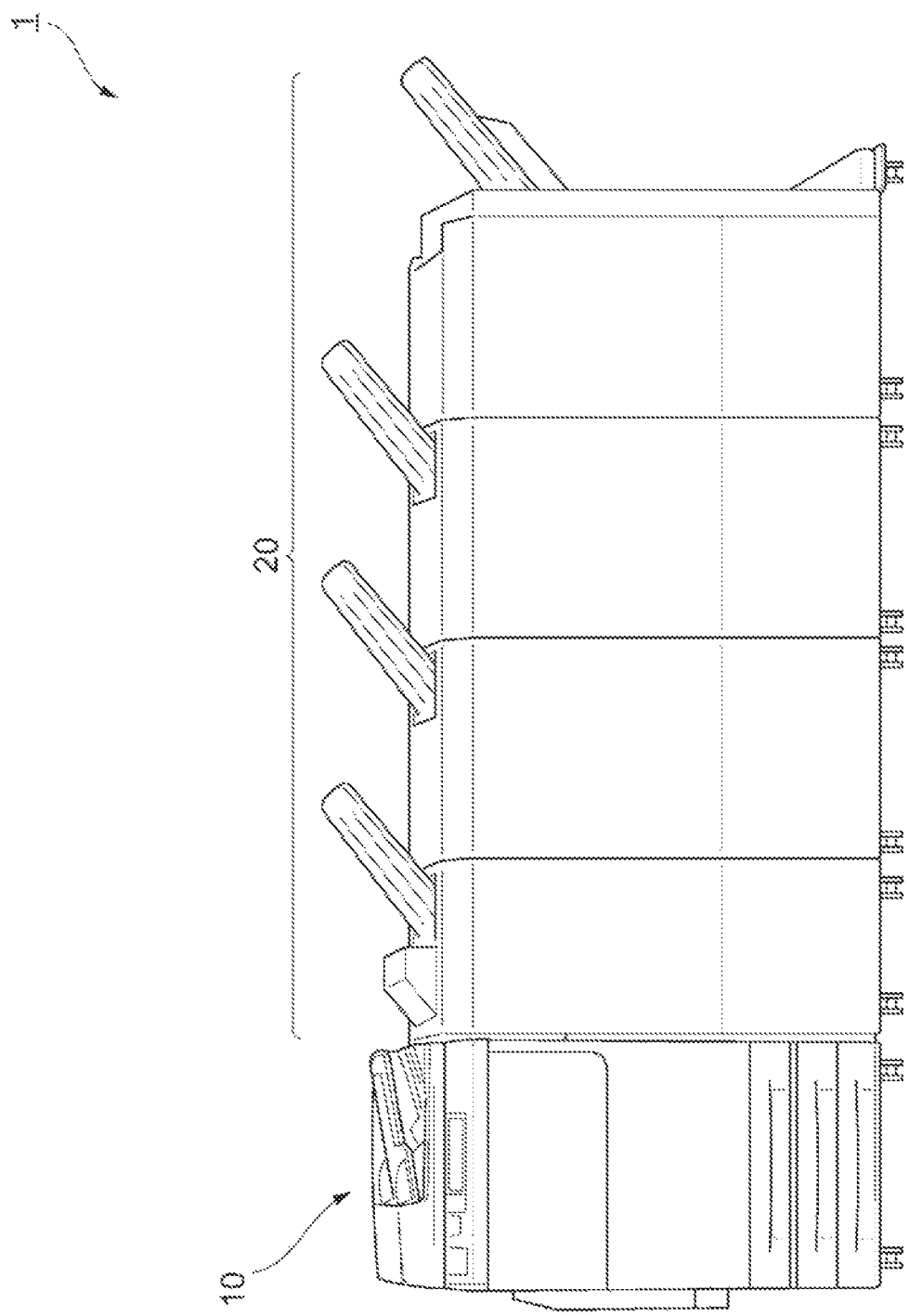
FIG. 1 illustrates an example of the overall configuration of an image forming system to which the exemplary embodiment is applied.

FIG. 1 illustrates an example of the overall configuration of an image forming system 1 to which the exemplary embodiment is applied. As shown in FIG. 1, the image forming system 1 includes an image forming apparatus 10 and a sheet transport apparatus 20.

The image forming apparatus 10 forms an image on a sheet. More specifically, the image forming apparatus 10 forms a toner image based on image data by using an electrophotographic system, for example. The image forming apparatus 10 may use another system, such as an inkjet head system, to form an image.

The sheet transport apparatus 20 transports a sheet having an image thereon formed by the image forming apparatus 10. The configuration of the sheet transport apparatus 20 will be discussed below.

[Configuration of Sheet Transport Apparatus]

Figure 2:
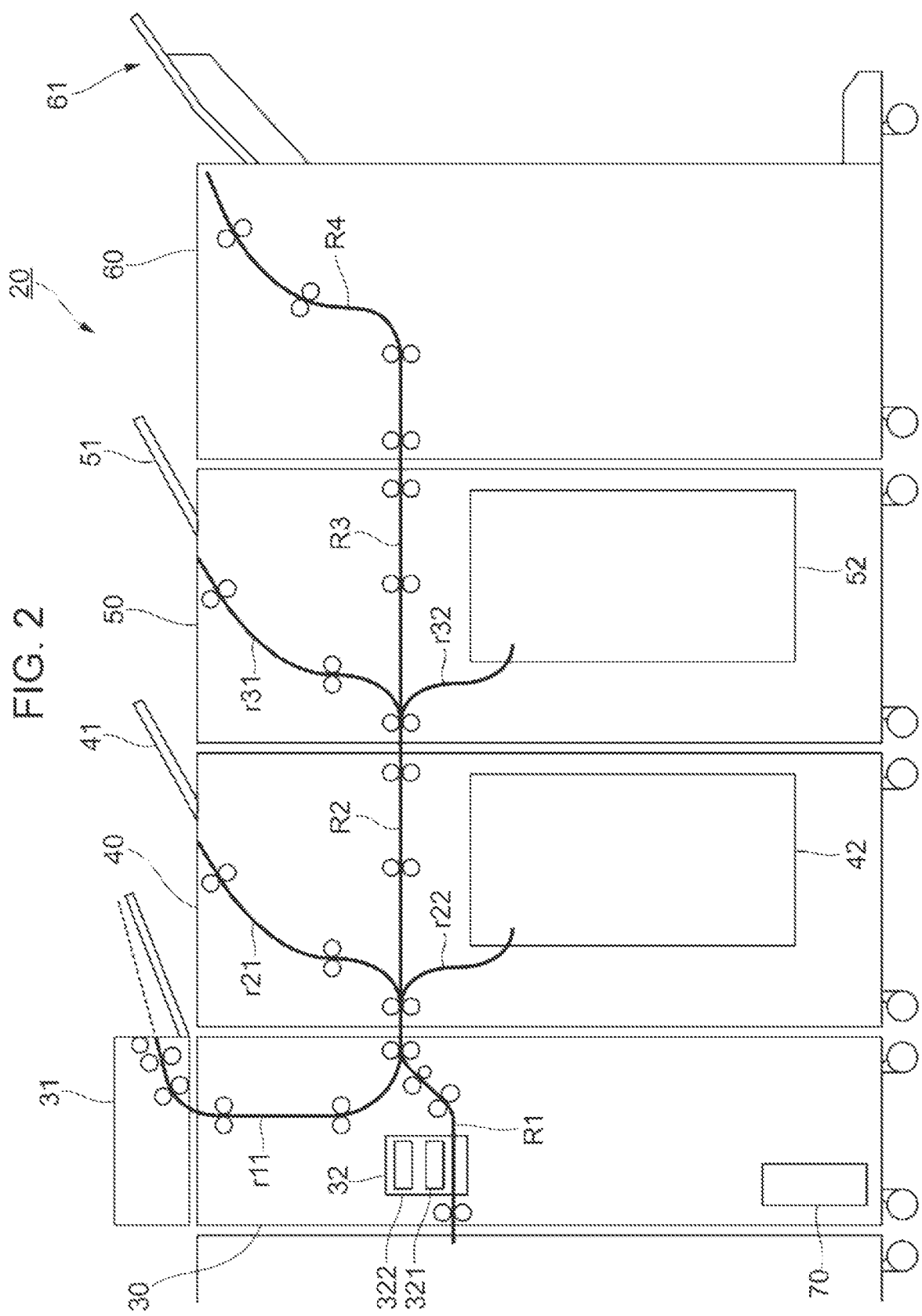
FIG. 2 illustrates the configuration of a sheet transport apparatus in the exemplary embodiment.

FIG. 2 illustrates the configuration of the sheet transport apparatus 20. The sheet transport apparatus 20 includes a transport unit 30, a first stacker unit 40, a second stacker unit 50, a sheet output unit 60, and a sheet transport control device 70. Although two stacker units, that is, the first and second stacker units 40 and 50, are shown in FIG. 2, three or more stacker units may be provided.

In the transport unit 30, a first transport path R1 is disposed. The first transport path R1 is connected to the downstream side of the image forming apparatus 10 in the transport direction of a sheet. A sheet from the image forming apparatus 10 is transported through the first transport path R1 toward the first stacker unit 40.

On the top side of the transport unit 30, an interposer 31 is disposed to feed a sheet into the transport unit 30. In the transport unit 30, a merge path r11 extends from the interposer 31 toward the first transport path R1 and merges into the first transport path R1. A sheet fed from the interposer 31 passes through the merge path r11 and is supplied to the first transport path R1.

In the transport unit 30, an inspection device 32 is provided to inspect a sheet passing through the first transport path R1. The inspection device 32 includes an image reader 321 and a judger 322. The image reader 321 reads an image formed on a sheet passing through the inspection device 32. The image reader 321 is constituted by a scanner including imaging elements, such as a charge-coupled devices (CCDs). The judger 322 is constituted by a computer including a central processing unit (CPU), which is an example of a processor.

In the transport unit 30, plural transport rollers are disposed to transport sheets along the first transport path R1 and the merge path r11.

In the first stacker unit 40, a second transport path R2 is disposed. The second transport path R2 is connected to the downstream side of the first transport path R1 in the transport unit 30 in the transport direction of a sheet. A sheet from the first transport path R1 is transported through the second transport path R2 toward the second stacker unit 50.

The first stacker unit 40 includes a first output section 41 and a first stacker 42. A sheet is output to the first output section 41 via a branch path r21 branching off from the second transport path R2 and is loaded on the first output section 41. The first stacker 42 is connected to a branch path r22 branching off from the second transport path R2 and receives and stores a sheet transported through the branch path r22. In the first stacker unit 40, plural transport rollers are disposed to transport sheets along the second transport path R2 and the branch paths r21 and r22.

In the second stacker unit 50, a third transport path R3 is disposed. The third transport path R3 is connected to the downstream side of the second transport path R2 in the first stacker unit 40 in the transport direction of a sheet. A sheet from the second transport path R2 is transported through the third transport path R3 toward the sheet output unit 60.

The second stacker unit 50 includes a second output section 51 and a second stacker 52. A sheet is output to the second output section 51 via a branch path r31 branching off from the third transport path R3 and is loaded on the second output section 51. The second stacker 52 is connected to a branch path r32 branching off from the third transport path R3 and receives and stores a sheet transported through the branch path r32. In the second stacker unit 50, plural transport rollers are disposed to transport sheets along the third transport path R3 and the branch paths r31 and r32.

In the sheet output unit 60, a fourth transport path R4 is disposed. The fourth transport path R4 is connected to the downstream side of the third transport path R3 in the second stacker unit 50 in the transport direction of a sheet. A sheet from the third transport path R3 is transported through the fourth transport path R4.

The sheet output unit 60 includes a third output section 61 provided on the downstream side of the fourth transport path R4 in the transport direction of a sheet. A sheet transported through the fourth transport path R4 is output to and loaded on the third output section 61. In the sheet output unit 60, plural transport rollers are disposed to transport sheets along the fourth transport path R4.

The sheet transport control device 70 controls the transport unit 30, the first stacker unit 40, the second stacker unit 50, and the sheet output unit 60. For example, the sheet transport control device 70 determines a location to which a sheet is output from among multiple locations, that is, the first output section 41, the first stacker 42, the second output section 51, the second stacker 52, and the third output section 61. The sheet transport control device 70 then drives a switching member (not shown) provided at a node between the second transport path R2 and the branch paths r21 and r22 or a switching member (not shown) provided at a node between the third transport path R3 and the branch paths r31 and r32 so that a sheet can be output to the determined location. The detailed operation of the sheet transport control device 70 will be discussed below.

[Specific Example of Operation of Sheet Transport Control Device]

Figure 3:
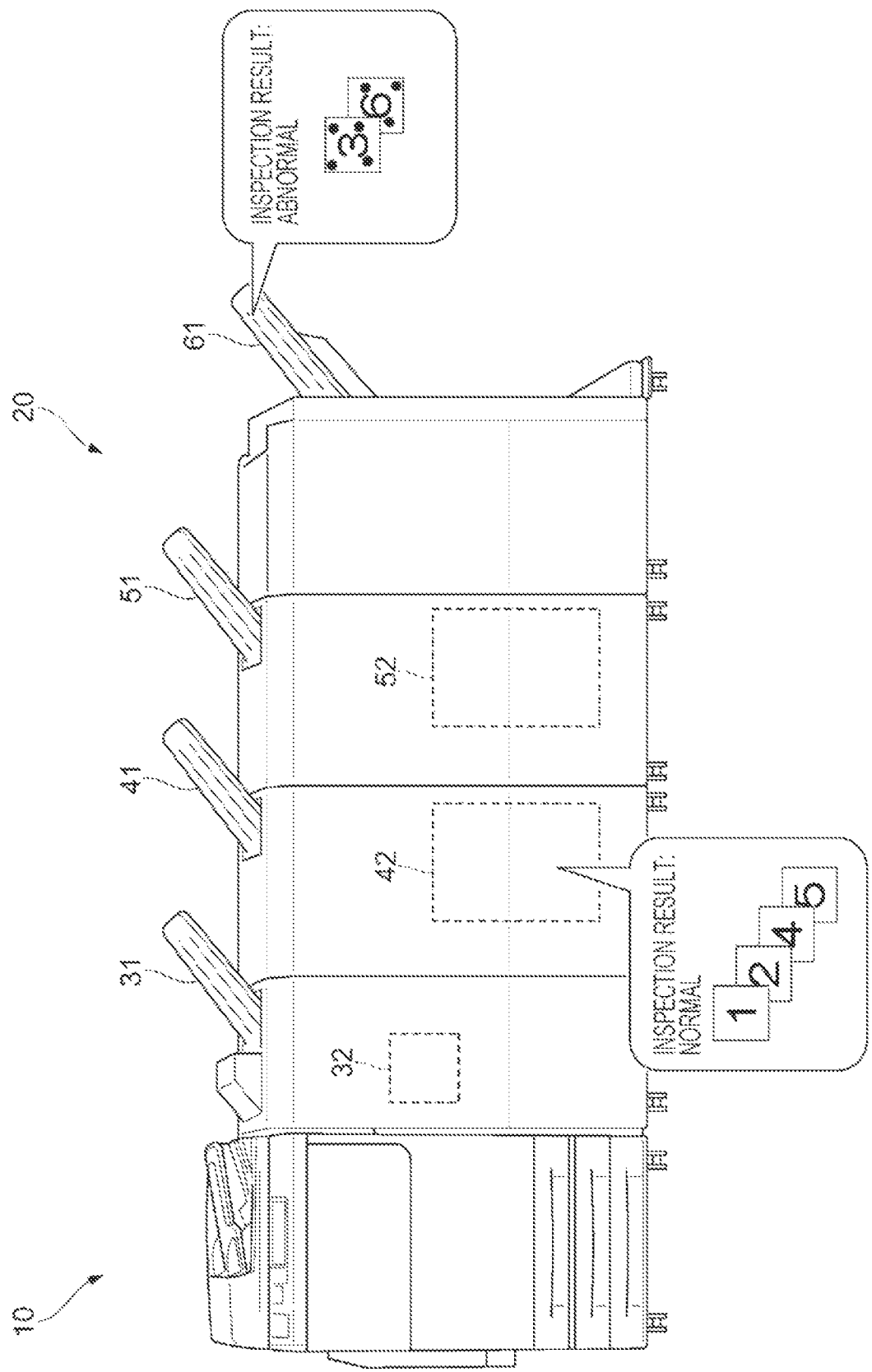
FIG. 3 illustrates a specific example of the typical operation of a sheet transport apparatus when performing first printing.
Figure 4:
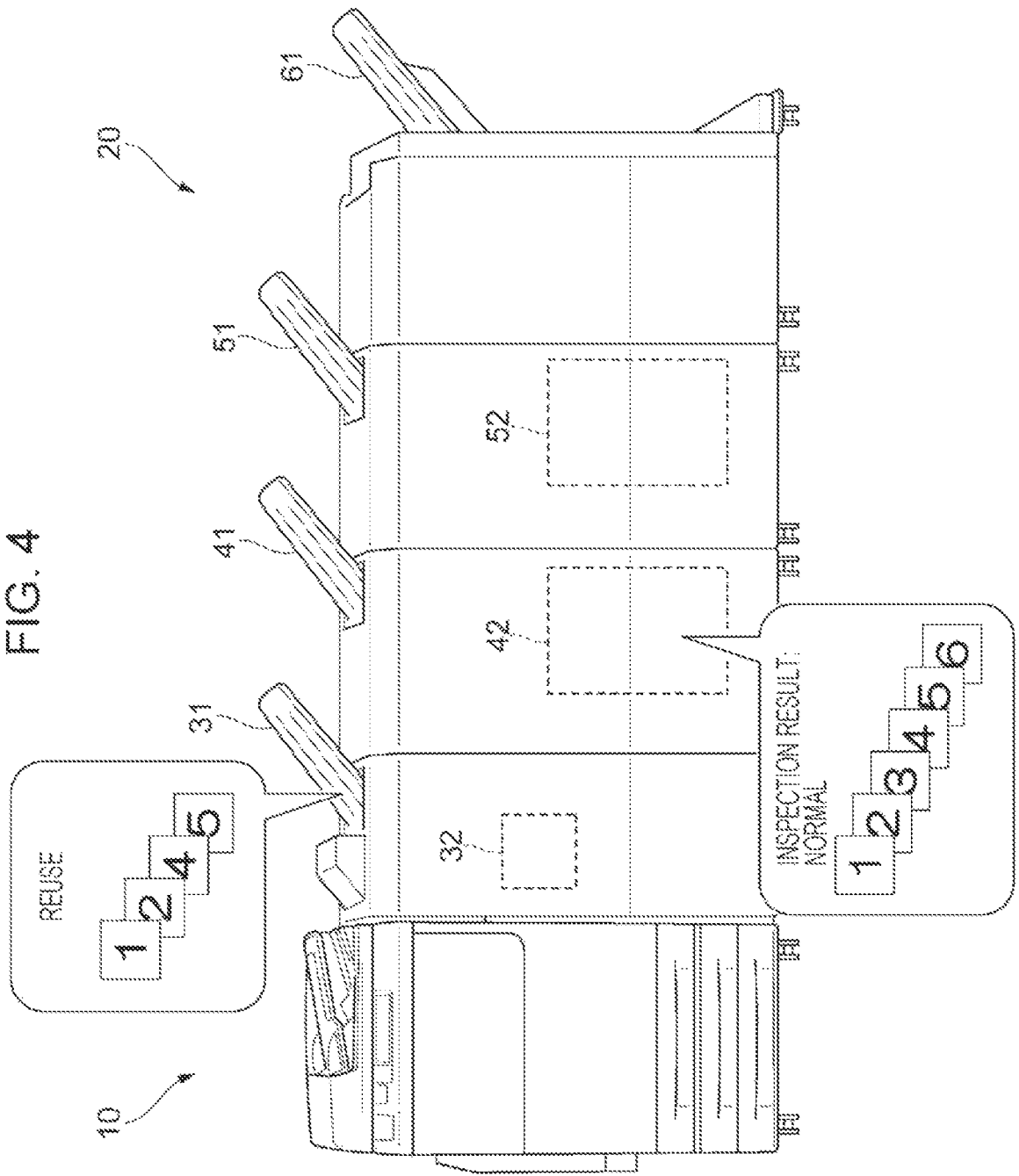
FIG. 4 illustrates a specific example of the typical operation of the sheet transport apparatus when performing reprinting.

FIGS. 3 and 4 illustrate specific examples of the typical operation of the sheet transport apparatus 20. In the exemplary embodiment, a sheet which is judged to be normal as a result of the inspection in the inspection device 32 is output to a predetermined normal-sheet output location. In FIGS. 3 and 4, the first output section 41, the first stacker 42, the second output section 51, and the second stacker 52 are normal-sheet output locations. A sheet which is judged to be abnormal as a result of the inspection in the inspection device 32 is output to a predetermined abnormal-sheet output location. In FIGS. 3 and 4, the third output section 61 is the abnormal-sheet output location.

FIG. 3 illustrates a specific example of the typical operation of the sheet transport apparatus 20 when performing first printing. FIG. 3 shows a case in which the image forming apparatus 10 has formed images on six sheets and sent them to the sheet transport apparatus 20. In the sheet transport apparatus 20, the first, second, fourth, and fifth sheets which are judged to be normal as a result of the inspection in the inspection device 32 are output to the first stacker 42, which is one of the normal-sheet output locations. In contrast, the third and sixth sheets which are judged to be abnormal due to the presence of a stain as a result of the inspection in the inspection device 32 are output to the third output section 61, which is the abnormal-sheet output location.

FIG. 4 illustrates a specific example of the typical operation of the sheet transport apparatus 20 when performing reprinting. As shown in FIG. 4, the first, second, fourth, and fifth sheets which are judged to be normal in the first printing are reused and fed from the interposer 31. In contrast, regarding the third and sixth sheets which are judged to be abnormal in the first printing, the image forming apparatus 10 performs reprinting on new sheets. If the reprinted third and sixth sheets are judged to be normal as a result of the inspection in the inspection device 32, the sheet transport apparatus 20 merges them with the first, second, fourth, and fifth sheets fed from the interposer 31 and then outputs the first through sixth sheets in this order to the first stacker 42.

In the above-described operation, however, if the number of sheets judged to be normal as a result of the inspection in the inspection device 32 exceeds the maximum number of sheets that can be loaded on the interposer 31, it is not possible to perform the above-described reprinting and merging.

To address this issue, in the exemplary embodiment, if an abnormality is found in the inspection result of the inspection device 32, the sheet transport apparatus 20 outputs the maximum number of sheets that can be loaded on the interposer 31 or a specified number of sheets smaller than this maximum number (hereinafter the maximum number and the specified number will be collectively called a prescribed number) to a normal-sheet output location. If the number of sheets output to this normal-sheet output location reaches the prescribed number, the sheet transport apparatus 20 switches to the next normal-sheet output location. This enables a user to supply the sheets output to the first normal-sheet output location by using the interposer 31 and to perform reprinting and merging by using all the sheets output to the first normal-sheet output location.

Figure 5:
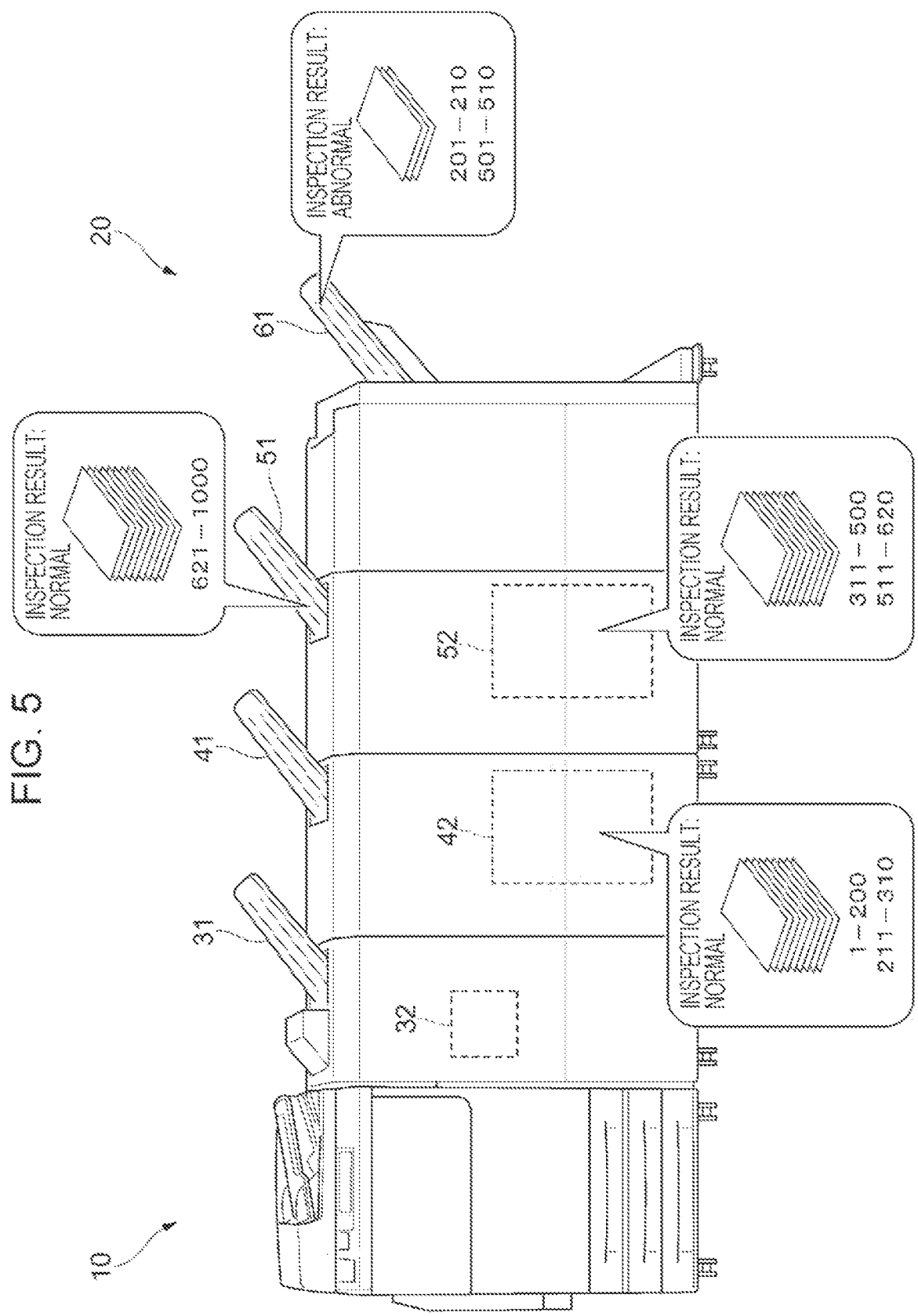
FIG. 5 illustrates a specific example of the operation of the sheet transport apparatus in the exemplary embodiment.

FIG. 5 illustrates a specific example of the operation of the sheet transport apparatus 20 in the exemplary embodiment. It is assumed that, while 1000 sheets are being output, the 201st through 210th sheets and the 501st through 510th sheets are judged to be abnormal as a result of the inspection in the inspection device 32. The above-described prescribed number is 300.

As shown in FIG. 5, the sheet transport apparatus 20 first outputs the 1st through 200th sheets that are judged to be normal as a result of the inspection in the inspection device 32 (such sheets may simply be called normal sheets) to the first stacker 42. Then, the sheet transport apparatus 20 outputs the 201st through 210th sheets that are judged to be abnormal as a result of the inspection in the inspection device 32 (such sheets may simply be called abnormal sheets) to the third output section 61. Then, the sheet transport apparatus 20 starts outputting the 211th sheet to the first stacker 42. When the sheet transport apparatus 20 has output the 310th sheet to the first stacker 42, the number of sheets output to the first stacker 42 reaches the prescribed number, which is 300. The sheet transport apparatus 20 thus switches the output location to the second stacker 52.

Next, the sheet transport apparatus 20 outputs the 311th through 500th sheets, which are normal sheets, to the second stacker 52. Then, the sheet transport apparatus 20 outputs the 501st through 510th sheets, which are abnormal sheets, to the third output section 61. Then, the sheet transport apparatus 20 starts outputting the 511th sheet to the second stacker 52. When the sheet transport apparatus 20 has output the 620th sheet to the second stacker 52, the number of sheets output to the second stacker 52 reaches the prescribed number, which is 300. The sheet transport apparatus 20 thus switches the output location to the second output section 51.

The sheet transport apparatus 20 outputs the 621st through 1000th sheets, which are normal sheets, to the second output section 51.

This enables a user to perform reprinting for the 201st through 210th sheets, which are abnormal sheets, while feeding the 300 sheets output to the first stacker 42 by using the interposer 31. The user is also able to perform reprinting for the 501st through 510th sheets, which are abnormal sheets, while feeding the 300 sheets output to the second stacker 52 by using the interposer 31.

In the above-described example, the operation of the sheet transport apparatus 20 when an abnormality is found in the inspection result of the inspection device 32 has been discussed. If no abnormality is found in the inspection result of the inspection device 32, there is no need to feed normal sheets by using the interposer 31. Accordingly, after starting outputting sheets to a normal-sheet output location, the sheet transport apparatus 20 can continue outputting sheets to this normal-sheet output location unless an abnormality in the inspection result of the inspection device 32 is detected.

In the exemplary embodiment, when switching to the next normal-sheet output location, the sheet transport apparatus 20 selects a normal-sheet output location in which the number of sheets that can be stored is smaller (such an output location may also be called an output location having a smaller storage capacity) as the next normal-sheet output location. The selected normal-sheet output location may simply be called a switching location.

Figure 6:
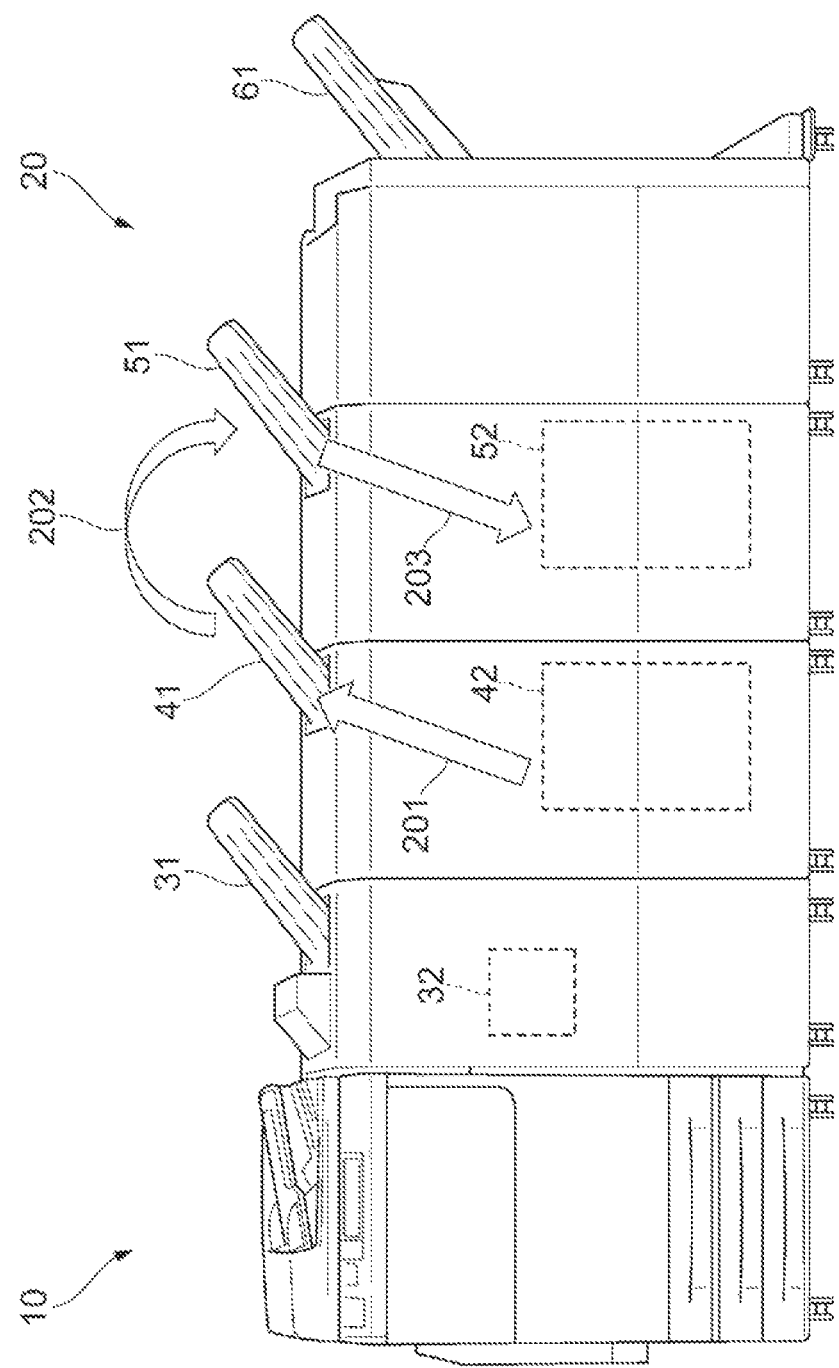
FIG. 6 illustrates a specific example of the operation of the sheet transport apparatus when switching the sheet output location.

FIG. 6 illustrates a specific example of the operation of the sheet transport apparatus 20 when switching the output location. It is assumed that the number of sheets that can be stored in the first and second output sections 41 and 51 is 400, that of the first and second stackers 42 and 52 are 2000, and that of the third output section 61 is 200.

While the sheet transport apparatus 20 is outputting sheets to the first stacker 42, an abnormality is found in the inspection result of a certain sheet, and then, the number of sheets output to the first stacker 42 has reached the prescribed number. As indicated by the arrow 201, the sheet transport apparatus 20 thus switches the output location to the first output section 41, which is one of the normal-sheet output locations having the smallest storage capacity.

Then, while the sheet transport apparatus 20 is outputting sheets to the first output section 41, an abnormality is found in the inspection result of a certain sheet, and then, the number of sheets output to the first output section 41 has reached the prescribed number. As indicated by the arrow 202, the sheet transport apparatus 20 thus switches the output location to the second output section 51, which is the normal-sheet output location currently having the smallest storage capacity.

Then, while the sheet transport apparatus 20 is outputting sheets to the second output section 51, an abnormality is found in the inspection result of a certain sheet, and then, the number of sheets output to the second output section 51 has reached the prescribed number. As indicated by the arrow 203, the sheet transport apparatus 20 thus switches the output location to the second stacker 52, which is the normal-sheet output location currently having the smallest storage capacity.

It is now assumed that, while 1000 sheets are being output to the first stacker 42 based on a current print instruction, an abnormality has occurred in a sheet, and only 300 sheets are output to the first stacker 42. In this case, if no more abnormality occurs in the remaining 700 sheets, 400 sheets are output to the first output section 41 and 300 sheets are output to the second output section 51. That is, the remaining 700 sheets are not output to the second stacker 52, and if a large number of sheets are output in response to the subsequent print instruction, the second stacker 52 can accommodate this large number of sheets.

As discussed above, when the sheet transport apparatus 20 switches the sheet output location, it selects a sheet output location whose number of sheets that can be stored is smaller (currently having a smaller storage capacity). In addition to this condition, the condition that a sheet output location whose storable number of sheets is greater than or equal to the remaining number of sheets to be output based on a print instruction is selected may be added. That is, the sheet transport apparatus 20 may select a sheet output location whose storable number of sheets is smaller than in other output locations and is greater than or equal to the remaining number of sheets to be output based on a print instruction.

In this case, if the normal-sheet output location to be selected satisfies the condition that the number of sheet that can be stored is greater than or equal to the remaining number of sheets to be output based on a print instruction, the sheet transport apparatus 20 switches to this output location. If the normal-sheet output location to be selected does not satisfy this condition, the sheet transport apparatus 20 selects another normal-sheet output location.

It is now assumed that, while 1000 sheets are being output to the first stacker 42 in response to a current print instruction, an abnormality has occurred in a sheet, and only 300 sheets are output to the first stacker 42. In this case, the remaining 700 sheets are not output to the first output section 41 or the second output section 51, neither of which is capable of storing 700 sheets, but are output to the second stacker 52 which is capable of storing 700 sheets.

If the condition that a normal-sheet output location having a smaller storage capacity is selected is only utilized, it can be said that the priority is given to outputting of sheets to a large-capacity stacker based on a subsequent print instruction. That is, a subsequent-printing priority mode is employed. If the condition that a normal-sheet output location whose storable number of sheets is smaller than in other output locations and is greater than or equal to the remaining number of sheets to be output based on the current print instruction is selected is utilized, it can be said that the priority is given to using of more output locations for storing sheets based on the current print instruction. That is, a current-printing priority mode is employed.

In the exemplary embodiment, the third output section 61 is used as the abnormal-sheet output location. However, if the third output section 61 is used as a normal-sheet output location and if the remaining number of sheets to be output based on a print instruction is 200 or smaller in the above-described example, the sheet transport apparatus 20 may select the third output section 61 as the switching location.

[Hardware Configuration of Sheet Transport Control Device]

Figure 7:
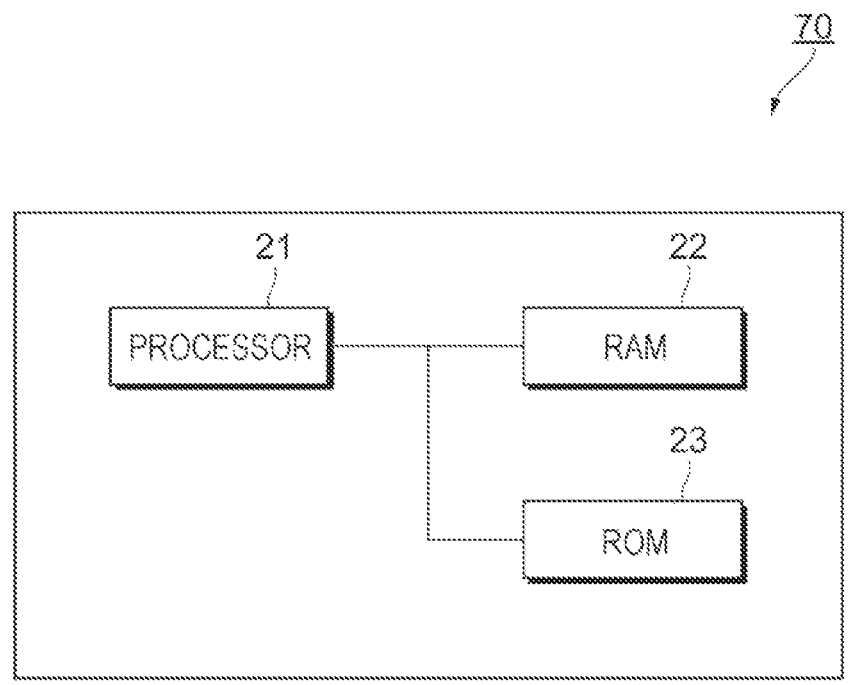
FIG. 7 is a block diagram illustrating an example of the hardware configuration of a sheet transport control device in the exemplary embodiment.

FIG. 7 is a block diagram illustrating an example of the hardware configuration of the sheet transport control device 70. As shown in FIG. 7, the sheet transport control device 70 includes a processer 21, a random access memory (RAM) 22, and a read only memory (ROM) 23.

As a result of loading various programs stored in the ROM 23, for example, into the RAM 22, the processor implements a function of controlling the transporting of sheets in the sheet transport apparatus 20.

The RAM 22 is a memory used as a work area by the processor 21. The ROM 23 stores various programs executed by the processor 21.

[Functional Configuration of Sheet Transport Control Device]

Figure 8:
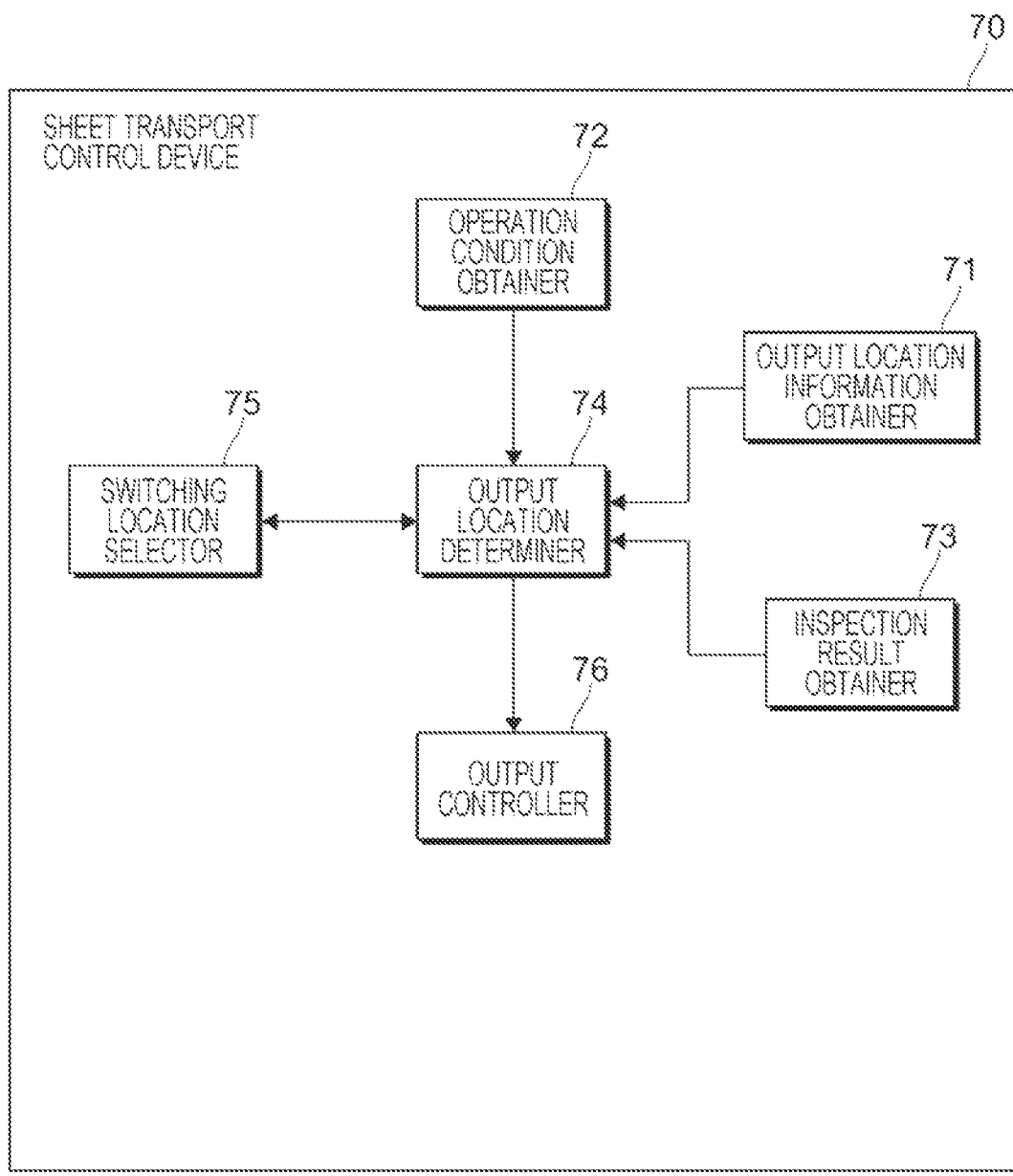
FIG. 8 is a block diagram illustrating an example of the functional configuration of the sheet transport control device.

FIG. 8 is a block diagram illustrating an example of the functional configuration of the sheet transport control device 70. As shown in FIG. 8, the sheet transport control device 70 includes an output location information obtainer 71, an operation condition obtainer 72, an inspection result obtainer 73, an output location determiner 74, a switching location selector 75, and an output controller 76.

The output location information obtainer 71 obtains output location information. The output location information is about the maximum number of sheets that can be loaded in the output location, such as the interposer 31. The output location information obtainer 71 obtains this output location information from the RAM 22 or the sheet transport apparatus 20. In the exemplary embodiment, the interposer 31 is used as an example of a supplier that supplies a medium without any defect.

The operation condition obtainer 72 obtains an operation condition to be used by the output location determiner 74. The operation condition is a condition for determining whether the output location information obtained by the output location information obtainer 71 or information specified by a user is to be used when the output location determiner 74 determines an output location of a sheet. The output location information obtained by the output location information obtainer 71 is the maximum number of sheets that can be loaded on the interposer 31, as discussed above. The information specified by a user is a specified number smaller than or equal to the maximum number of sheets that can be loaded on the interposer 31. The operation condition obtainer 72 obtains the operation condition, based on user input on an operation condition setting screen displayed on an operation panel (not shown) of the image forming system 1, for example. In the exemplary embodiment, as an example of a specific quantity smaller than or equal to the quantity of mediums that the supplier is capable of storing, the maximum number of sheets that can be loaded on the interposer 31 or the specified number smaller than or equal to this maximum number is used. An example of the quantity specified by a user using an operation unit is this specified number.

The inspection result obtainer 73 obtains an inspection result from the inspection device 32. The inspection result is information indicating whether the state of a printed sheet is normal or abnormal. In the exemplary embodiment, as an example of an inspection device that inspects the state of a medium, the inspection device 32 is used. As an example of information indicating whether a defect is detected in a medium, the inspection result is used. The processing of the inspection result obtainer 73 is used as an example of obtaining information indicating whether a defect is detected in a medium from the inspection device.

The output location determiner 74 obtains the output location information from the output location information obtainer 71, the operation condition from the operation condition obtainer 72, and the inspection result from the inspection result obtainer 73, and selects an output location to which a sheet is output, based on the obtained items of information. As discussed above, the operation condition is a condition for determining whether to use the output location information obtained by the output location information obtainer 71 or information specified by a user. If the operation condition obtained from the operation condition obtainer 72 indicates that the output location information obtained by the output location information obtainer 71 is to be used, the output location determiner 74 sets the maximum number of sheets that can be loaded on the interposer 31 as the prescribed number. If the operation condition obtained from the operation condition obtainer 72 indicates that information specified by a user is to be used, the output location determiner 74 sets the number specified by the user as the prescribed number.

More specifically, from among plural normal-sheet output locations, the output location determiner 74 determines an output location to which a normal sheet is output. In the exemplary embodiment, a normal-sheet output location is used as an example of a first output location, and the processing of the output location determiner 74 is used as an example of performing control to output a medium without a defect among plural mediums to the first output location.

If the inspection result of a sheet to be output indicates that an abnormality has occurred in this sheet while sheets are being output to a normal-sheet output location, the output location determiner 74 switches the output location to an abnormal-sheet output location. Thereafter, the output location determiner 74 switches back the output location to the normal-sheet output location and keeps using this normal-sheet output location until the number of sheets output to the normal-sheet output location reaches the prescribed number. In the exemplary embodiment, as an example of an output location different from the first output location, the abnormal-sheet output location is used. The processing of the output location determiner 74 is used as an example of performing control to output a medium with a defect among the plural mediums to the output location different from the first output location. In the exemplary embodiment, as an example of a predetermined quantity, the prescribed number is used, and the processing of the output location determiner 74 is used as an example of performing control to, after the medium with a defect is output to the output location different from the first output location, keep outputting a medium without a defect among the plural mediums to the first output location until the quantity of mediums output to the first output location reaches the predetermined quantity.

If the inspection result of a sheet to be output indicates that an abnormality has occurred in this sheet while sheets are being output to a normal-sheet output location and when the number of sheets output to this normal-sheet output location has reached the prescribed number, the output location determiner 74 switches the output location to another normal-sheet output location. In this case, the output location determiner 74 causes the switching location selector 75 to select an output location as the switching location. In the exemplary embodiment, as an example of a second output location, the switching location is used. In the exemplary embodiment, the processing of the output location determiner 74 is used as an example of performing control to, after a medium with a defect is detected in the plural mediums, output a medium without a defect among the plural mediums to the second output location when the quantity of mediums output to the first output location has reached the predetermined quantity. In the exemplary embodiment, the processing of the output location determiner 74 is used as an example of performing control to, if a medium with a defect has been detected in the plural mediums, output a medium without a defect among the plural mediums to the second output location when the quantity of mediums output to the first output location has reached the predetermined quantity.

If no abnormality has occurred in a sheet to be output while sheets are being output to a normal-sheet output location, the output location determiner 74 determines to use this normal-sheet output location as the output location even after the number of sheets output to the normal-sheet output location has reached the prescribed number. In the exemplary embodiment, the processing of the output location determiner 74 is used as an example of performing control to, if no medium with a defect is detected in the plural mediums, output a medium without a defect among the plural mediums to the first output location even after the quantity of mediums output to the first output location has reached the predetermined quantity.

The switching location selector 75 selects the switching location from among the plural normal-sheet output locations, based on the number of sheets that can be stored in each of the normal-sheet output locations. In the exemplary embodiment, the processing of the switching location selector 75 is used as an example of selecting the second output location from among the output locations other than the first output location, based on the quantity of mediums that can be stored in each of the plural output locations.

More specifically, in the subsequent-printing priority mode, the switching location selector 75 selects, as the switching location, the normal-sheet output location whose storable number of sheets is the smallest among the normal-sheet output locations. In the exemplary embodiment, the processing of the switching location selector 75 is used as an example of selecting the second output location by using the condition that the storable quantity of mediums of the second output location is the smallest among the plural output locations.

In the current-printing priority mode, the switching location selector 75 selects, as the switching location, the normal-sheet output location whose storable number of sheets is the smallest among the normal-sheet output locations and is also greater than or equal to the number of sheets which have not yet been output based on a print instruction. In the exemplary embodiment, the processing of the switching location selector 75 is used as an example of selecting the second output location by using the condition that the storable quantity of mediums of the second output location is the smallest among the plural output locations and is also greater than or equal to the quantity of mediums that have not yet been output.

The output controller 76 controls the sheet transport apparatus 20 so that a sheet is output to the output location determined by the output location determiner 74.

Figure 9:
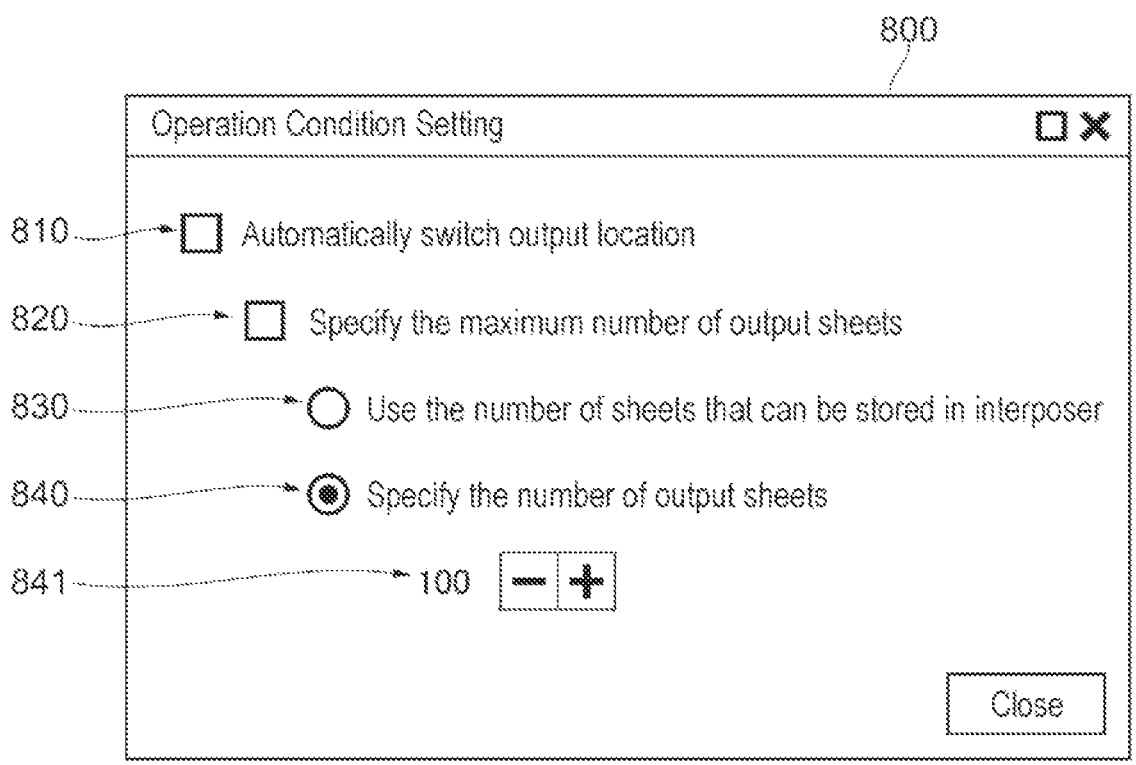
FIG. 9 illustrates an example of an operation condition setting screen displayed in the exemplary embodiment.

FIG. 9 illustrates an example of an operation condition setting screen 800 displayed on an operation panel (not shown) of the image forming system 1 when the operation condition obtainer 72 obtains the operation condition.

As shown in FIG. 9, the operation condition setting screen 800 has a field 810. By using the field 810, a user can select whether to automatically switch the output location. The field 810 includes a field 820. By using the field 820, the user can specify the maximum number of output sheets.

The field 820 includes radio buttons 830 and 840. If the user wishes to use the number of sheets that can be loaded on the interposer 31 as the maximum number of output sheets, the user clicks the radio button 830. If the user wishes to specify a desired number of sheets as the maximum number of output sheets, the user clicks the radio button 840. In this case, the user can specify the number of sheets by using a numerical value interface (UI) 841. The number of sheets to be specified by the user is smaller than or equal to the number of sheets that can be loaded on the interposer 31.

[Operation of Sheet Transport Control Device]

Figure 10:
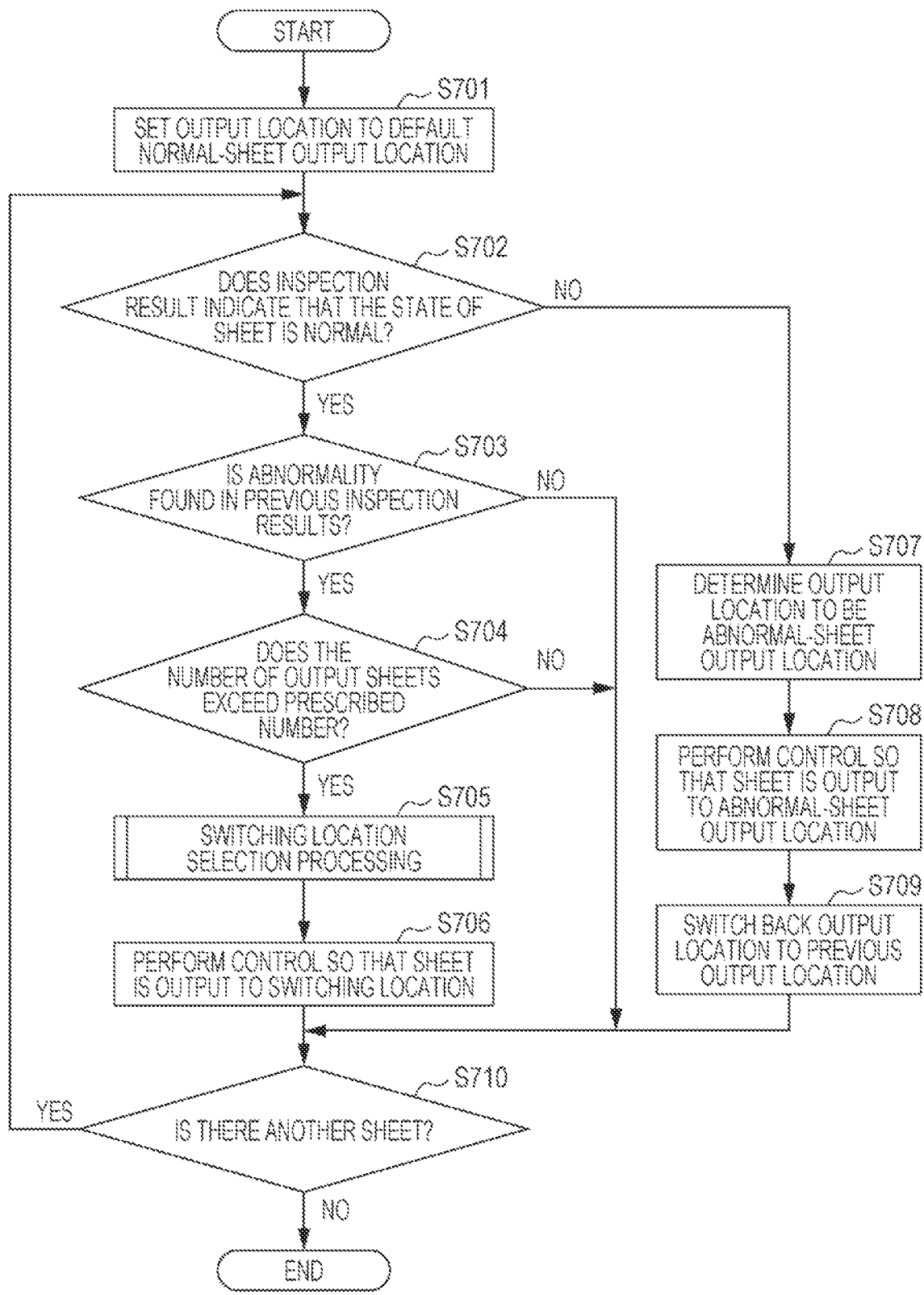
FIG. 10 is a flowchart illustrating an example of the operation executed by the sheet transport control device in the exemplary embodiment.

FIG. 10 is a flowchart illustrating an example of the operation executed by the sheet transport control device 70. Prior to this operation, the output location information obtainer 71 has obtained the output location information, the operation condition obtainer 72 has obtained the operation condition, and the output location determiner 74 has received the output location information and the operation condition. Every time a sheet is transported from the image forming apparatus 10 to the sheet transport apparatus 20, the inspection result obtainer 73 obtains the inspection result of the sheet from the inspection device 32 and sends it to the output location determiner 74.

In step S701, in the sheet transport control device 70, the output location determiner 74 first sets the output location to be a default normal-sheet output location.

In step S702, the output location determiner 74 checks the inspection result of a subject sheet received from the inspection result obtainer 73 and judges whether the inspection result indicates that the state of the sheet is normal.

An explanation will first be given of the case in which the inspection result indicates that the state of the sheet is normal. In this case, in step S703, the output location determiner 74 checks the inspection results received from the inspection result obtainer 73 so far and judges whether an abnormality is found in the inspection results.

If it is determined in step S703 that an abnormality is found in the inspection results, the output location determiner 74 judges in step S704 whether the number of sheets output to the normal-sheet output location exceeds the prescribed number. In step S704, the output location determiner 74 determines the prescribed number based on the output location information received from the output location information obtainer 71 and the operation condition received from the operation condition obtainer 72. More specifically, if the operation condition received from the operation condition obtainer 72 indicates that the maximum number of sheets that can be loaded on the interposer 31 is to be used, the output location determiner 74 sets this maximum number as the prescribed number. If the operation condition indicates that the number of sheets specified by a user is to be used, the output location determiner 74 sets the specified number as the prescribed number.

If the number of sheets output to the normal-sheet output location is found to exceed the prescribed number in step S704, the output location determiner 74 calls the switching location selector 75. The switching location selector 75 then executes switching location selection processing in step S705. The process then proceeds to step S706. Details of the switching location selection processing will be discussed later.

If it is determined in step S703 that no abnormality is found in the inspection results or if it is found in step S704 that the number of sheets output to the normal-sheet output location does not exceed the prescribed number, the output location determiner 74 skips steps S705 and S706.

In step S706, the output controller 76 performs control so that the sheet is output to the switching location selected in the switching location selection processing.

An explanation will now be given of the case in which the inspection result does not indicate that the state of the sheet is normal, that is, it is found in step S702 that the state of the sheet is abnormal. In this case, in step S707, the output location determiner 74 determines the output location of the sheet to be the abnormal-sheet output location.

Then, in step S708, the output controller 76 performs control so that the sheet is output to the abnormal-sheet output location determined in step S707. Then, in step S709, the output location determiner 74 switches back the output location to the previous output location.

Then, in step S710, the output location determiner 74 judges whether there is another sheet to be output. If another sheet is to output, the process returns to step S702. If there is no more sheet, the output location determiner 74 completes the processing.

Figure 11:
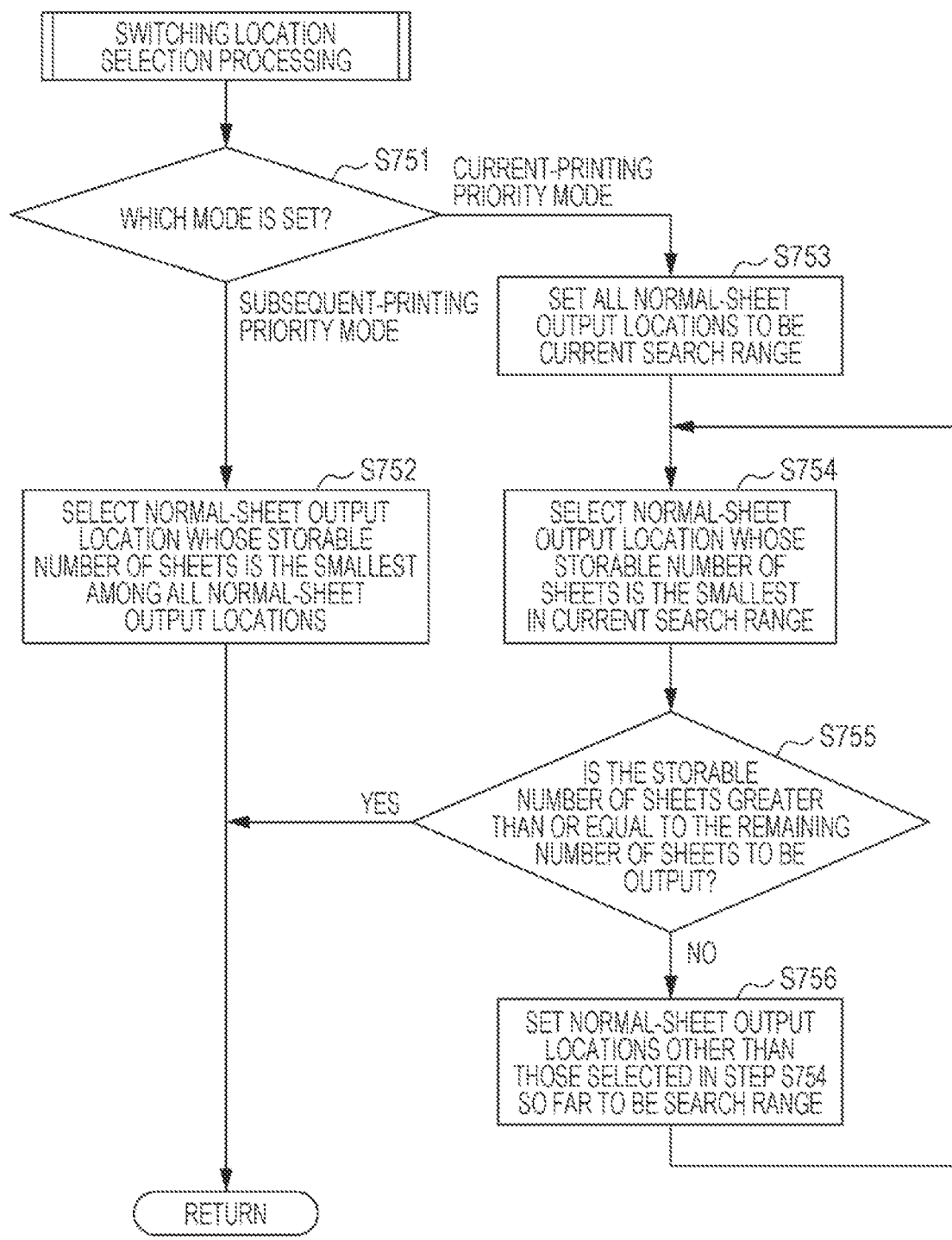
FIG. 11 is a flowchart illustrating details of switching location selection processing in FIG. 10.

FIG. 11 is a flowchart illustrating details of the switching location selection processing in step S705 in FIG. 10.

In step S751, the switching location selector 75 judges whether the subsequent-printing priority mode or the current-printing priority mode is set.

If it is judged in step S751 that the subsequent-printing priority mode is set, in step S752, the switching location selector 75 selects the output location whose storable number of sheets is the smallest among all the normal-sheet output locations and sets the selected normal-sheet output location as the switching location. The process then returns to step S705.

If it is judged in step S751 that the current-printing priority mode is set, in step S753, the switching location selector 75 sets all the normal-sheet output locations to be a current search range.

Then, in step S754, the switching location selector 75 selects the normal-sheet output location whose storable number of sheets is the smallest among all the normal-sheet output locations in the current search range. In step S755, the switching location selector 75 judges whether the storable number of sheets of the normal-sheet output location selected in step S754 is greater than or equal to the remaining number of sheets to be output based on the current print instruction.

If the storable number of sheets of the normal-sheet output location is not greater than or equal to the remaining number of sheets to be output (NO in step S755), in step S756, the switching location selector 75 sets normal-sheet output locations other than those selected in step S754 so far to be a search range. The process then returns to step S754.

If the storable number of sheets of the normal-sheet output location is greater than or equal to the remaining number of sheets to be output (YES in step S755), the switching location selector 75 maintains the normal-sheet output location most recently selected in step S754 as the switching location. The process then returns to step S705.

[Programs]

The processing executed by the sheet transport control device 70 may be provided as programs, such as application software.

A first program implementing the exemplary embodiment may be a program causing a computer to execute: a function of performing control to output, among plural mediums to be output, a medium without a defect to a first output location; a function of performing control to output, among the plural mediums, a medium with a defect to an output location different from the first output location; and a function of performing control to, after the medium with a defect is output to the output location different from the first output location, keep outputting a medium without a defect among the plural mediums to the first output location until a quantity of mediums output to the first output location reaches a predetermined quantity.

A second program implementing the exemplary embodiment may be a program causing a computer to execute: a function of performing control to output, among plural mediums to be output, a medium without a defect to a first output location; and a function of performing control to, if a medium with a defect has been detected in the plural mediums, output a medium without a defect among the plural mediums to a second output location when a quantity of mediums output to the first output location has reached a predetermined quantity.

The programs implementing the exemplary embodiment may be provided via a communication medium or be stored in a recording medium, such as a compact disc-read only memory (CD-ROM), and be provided.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A medium output control device comprising:
    a processor configured to:
        control outputting, from among a plurality of mediums to be output, a medium without a defect, to a first output location;
        control outputting, from among the plurality of mediums, a medium with a defect, to an output location different from the first output location;
        control outputting, after the medium with a defect is output to the output location, another medium without a defect, from among the plurality of mediums, to the first output location until a quantity of mediums output to the first output location reaches a predetermined quantity;
        control outputting, after a medium with a defect is detected among the plurality of mediums, a medium without a defect, from among the plurality of mediums, to a second output location if the quantity of mediums output to the first output location has reached the predetermined quantity; and
        control outputting, if no medium with a defect is detected among the plurality of mediums, a medium without a defect among the plurality of mediums to the first output location even after the quantity of mediums output to the first output location has reached the predetermined quantity.

2. The medium output control device according to claim 1, wherein the predetermined quantity is a specific quantity smaller than or equal to a maximum quantity of mediums that a supplier is capable of storing, the supplier being configured to supply a medium without a defect output to the first output location.

3. The medium output control device according to claim 2, wherein the specific quantity is a quantity specified by a user using an operation unit.

4. The medium output control device according to claim 1, wherein the processor is configured to select the second output location from among a plurality of output locations other than the first output location, using a maximum quantity of mediums that each of the plurality of output locations is capable of storing.

5. The medium output control device according to claim 4, wherein the processor is configured to select the second output location by using a condition that the maximum quantity of mediums that the second output location is capable of storing is the smallest among the plurality of output locations.

6. The medium output control device according to claim 5, wherein the processor is configured to select the second output location by using another condition that the maximum quantity of mediums that the second output location is capable of storing is greater than or equal to a quantity of mediums that have not yet been output among the plurality of mediums.

7. The medium output control device according to claim 1, wherein the processor is configured to obtain information indicating whether a defect is detected in each of the plurality of mediums, the information being obtained from an inspection device that inspects a state of each of the plurality of mediums.

8. A medium output control device comprising:
    a processor configured to:
        control outputting, from among a plurality of mediums to be output, a medium without a defect, to a first output location
        control outputting, if a medium with a defect has been detected among the plurality of mediums, a medium without a defect, from among the plurality of mediums, to a second output location if a quantity of mediums output to the first output location has reached a predetermined quantity; and
        control outputting, if no medium with a defect is detected among the plurality of mediums, a medium without a defect among the plurality of mediums to the first output location even after the quantity of mediums output to the first output location has reached the predetermined quantity.

9. A non-transitory computer readable medium storing a program, which if executed, causes a computer to execute a process, the process comprising:

controlling outputting, from among a plurality of mediums to be output, a medium without a defect, to a first output location controlling outputting, from among the plurality of mediums, a medium with a defect, to an output location different from the first output location;

controlling outputting, after the medium with a defect is output to the output location, another medium without a defect, from among the plurality of mediums, to the first output location until a quantity of mediums output to the first output location reaches a predetermined quantity;

controlling outputting, after a medium with a defect is detected among the plurality of mediums, a medium without a defect, from among the plurality of mediums, to a second output location if the quantity of mediums output to the first output location has reached the predetermined quantity; and control outputting, if no medium with a defect is detected among the plurality of mediums, a medium without a defect among the plurality of mediums to the first output location even after the quantity of mediums output to the first output location has reached the predetermined quantity.

10. A medium output control device comprising:
a processor configured to:

control outputting, from among a plurality of mediums to be output, a medium without a defect, to a first output location;

control outputting, from among the plurality of mediums, a medium with a defect, to an output location different from the first output location; and control outputting, after the medium with a defect is output to the output location different from the first output location, another medium without a defect, from among the plurality of mediums, to the first output location until a quantity of mediums output to the first output location reaches a predetermined quantity, wherein the processor is configured to control, after a medium with a defect is detected among the plurality of mediums, outputting a medium without a defect, from among the plurality of mediums, to a second output location if the quantity of mediums output to the first output location has reached the predetermined quantity, and wherein the processor is configured to control, if no medium with a defect is detected among the plurality of mediums, outputting a medium without a defect among the plurality of mediums to the first output location even after the quantity of mediums output to the first output location has reached the predetermined quantity.

11. The medium output control device according to claim 1, wherein the first output location is a stacker internal to the medium output control device.

\* \* \* \* \*